United States Patent [19]

Uhls

[11] 4,153,266
[45] May 8, 1979

[54] AIR SHOCK APPARATUS FOR MOTORCYCLES

[76] Inventor: Jimmie J. Uhls, Rte. 1, Elgin, Kans. 67361

[21] Appl. No.: 857,221

[22] Filed: Dec. 5, 1977

[51] Int. Cl.² .............................................. B62K 25/08
[52] U.S. Cl. ................................... 280/276; 188/314; 267/65 D; 280/711
[58] Field of Search ............... 267/64 R, 65 R, 65 D, 267/15 A; 180/32; 280/276, 702, 703, 708, 711, 712; 188/314

[56] References Cited

U.S. PATENT DOCUMENTS

| 3,019,029 | 1/1962 | Sampietro | 280/708 |
| 3,106,993 | 10/1963 | May | 188/314 |
| 3,459,441 | 8/1969 | Hornsby | 267/65 R |
| 3,664,681 | 5/1972 | Thaxton | 267/15 A |
| 3,854,710 | 12/1974 | Nicholls | 267/64 R |
| 3,869,141 | 3/1976 | Ito et al. | 280/708 |
| 3,945,626 | 3/1976 | Tilkens | 267/64 R |
| 4,049,251 | 9/1977 | Masae | 267/64 R |

FOREIGN PATENT DOCUMENTS

544741  6/1956  Italy ........................................ 267/64 R

Primary Examiner—Edward R. Kazenske
Attorney, Agent, or Firm—Phillip A. Rein

[57] ABSTRACT

This invention is an air shock apparatus readily sold as original equipment or attached to existing motorcycles and operable to achieve an air cushioned ride. More particularly, the air shock apparatus includes a control and fluid supply structure mounted through a connector member to supply shock absorbing fluid to a front fork support member that is connected to a front wheel assembly of the motorcycle. The control and fluid supply structure includes (1) a reservoir tank to supply the shock absorbing fluid to the front fork support member; (2) a pump assembly to supply fluid to the reservoir tank; (3) a valve member to control fluid pressure in the reservoir tank; and (4) a fluid equalizer assembly to adjust pressure of the fluid to left and right sides of the front fork support member. The air shock apparatus is self contained and easily regulated for the best ride in regard to existing road conditions.

3 Claims, 5 Drawing Figures

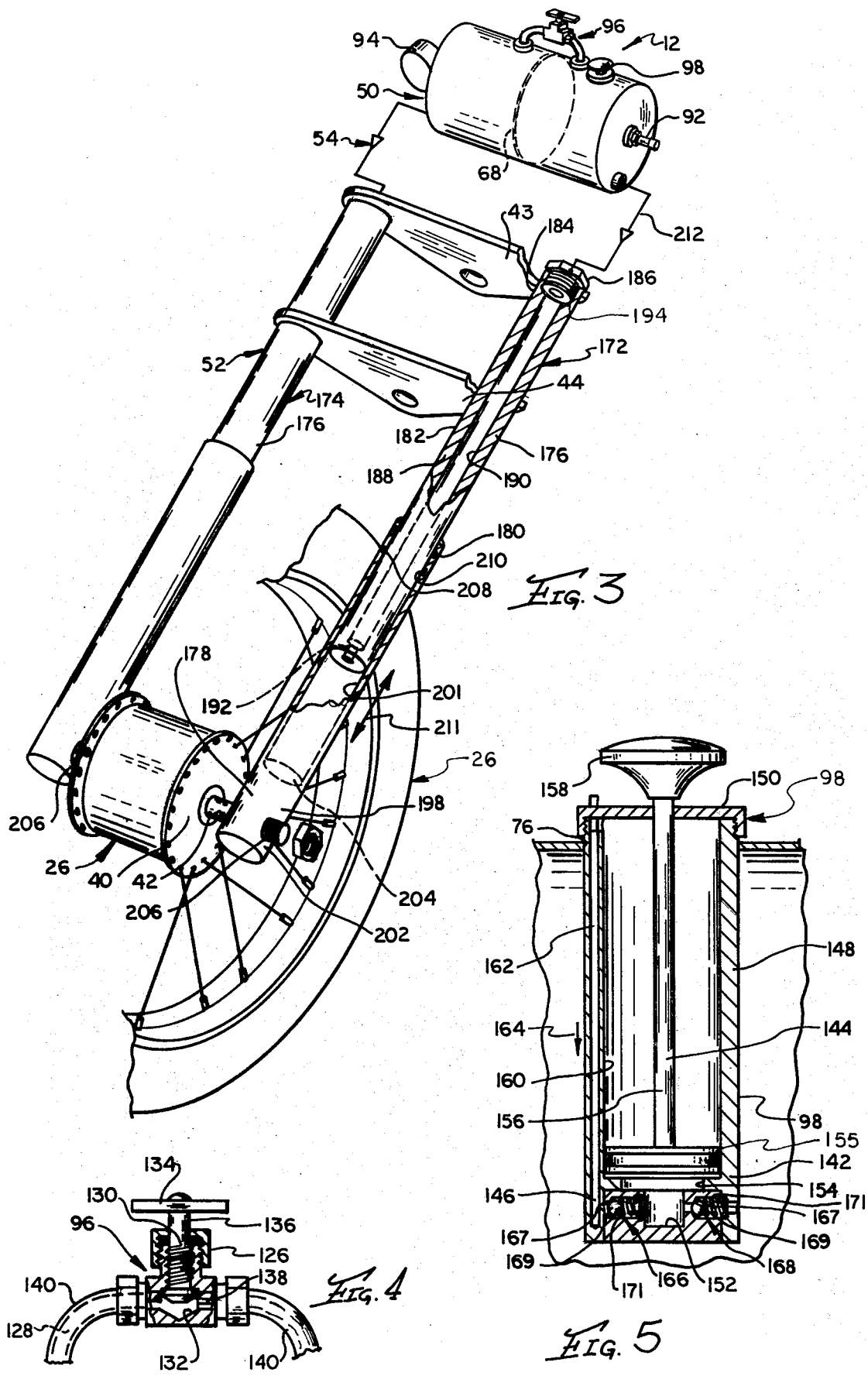

4,153,266

AIR SHOCK APPARATUS FOR MOTORCYCLES

PRIOR ART

A search into the prior art revealed the following U.S. patent references: Hornsby 3,459,441, Thaxton 3,664,681. Thaxton discloses a combination air bag structure with a compression spring used on pickup truck bodies. Thaxton is not operable similar to the applicant's apparatus.

Hornsby teaches the use of air pressure within a bag member mounted on the front fork assembly of a bicycle or a motorcycle.

However, the invention herein is substantially different relative to the prior art references in (1) operation; (2) having a self contained fluid supply source; (3) having means to equalize the pressure fluid for a consistent ride; and (4) having means to regulate fluid pressure for a soft or hard ride as desired depending on road conditions.

PREFERRED EMBODIMENT OF THE INVENTION

In one preferred embodiment of this invention, an air shock apparatus is readily mounted on a front support assembly of a motorcycle structure to provide shock absorbing features between a main motorcycle frame and a front wheel assembly. The air shock apparatus includes a control and fluid supply means or structure attached through a connector means to a front fork support means or member. The control and fluid supply means includes a reservoir tank assembly having a control means mounted thereon. The reservoir tank assembly includes a cylindrical tank member secured by an anchor bracket between the handle bars of the motorcycle structure. The tank member is divided into left and right chambers. The control means includes (1) a fluid supply or bleed valve connected to the tank member to add or relieve fluid pressure thereto; (2) a fluid gauge assembly connected to the tank member to indicate current pressure contained therein; (3) a fluid equalizer assembly connected between the left and right chambers to selectively equalize pressure therebetween; and (4) a pump assembly to add fluid pressure to the tank member as desired. The connector means includes first and second conduit assemblies connected to respective left and right chambers of the tank member to transmit pressure fluid to the first fork support means. The first fork support means includes first and second front tube assemblies connected to respective ones of the first and second conduit assemblies to receive pressure fluid therefrom. Each tube assembly is identical including (1) an upper tube assembly connected to one of the conduit assemblies to receive fluid therein; (2) a lower tube assembly having an upper end in telescoping relationship with the upper tube assembly and a lower end connected to the front wheel assembly of the motorcycle structure; and (3) a fluid seal assembly mounted between the upper tube assembly and the lower tube assembly to maintain pressure fluid therein. It is noted that relative movement between the upper and lower tube assemblies causes expansion and contraction of the pressure fluid contained therein and in the tank member to provide a shock absorbing, cushioned ride.

OBJECTS OF THE INVENTION

One object of this invention is to provide an air shock apparatus that is readily connected to existing motorcycle structures to provide an air shock ride thereto.

Another object of this invention is to provide an air shock apparatus having a front fork support means mounted between the support frame and the front wheel assembly of a motorcycle structure to control relative movement therebetween in a cushioned shock absorbing manner.

Still, one other object of this invention is to provide an air shock apparatus for motorcycle structures including a fluid supply reservoir tank having control means thereon to (1) add fluid pressure by a pump assembly; (2) read pressure therein through a pressure gauge; (3) equalize pressure between separate compartments; and (4) regulate pressure therein by a bleed valve.

One further object of this invention is to provide an air shock apparatus that is easy to install on existing structures, economical to add to new motorcycle structures, sturdy in construction, easy to regulate to existing road conditions, and provides a cushioned, shock absorbing motorcycle ride.

Various other objects, advantages, and features of the invention will become apparent to those skilled in the art from the following discussion, taken in conjunction with the accompanying drawings, in which:

DRAWING FIGURES

FIG. 3 is an exploded, schematic perspective view of the air shock apparatus of this invention;

FIG. 4 is a fragmentary sectional view of a portion of a control and fluid supply means of the air shock apparatus of this invention; and FIG. 5 is a sectional view of a pump assembly of the air shock apparatus of this invention.

Figure 1:
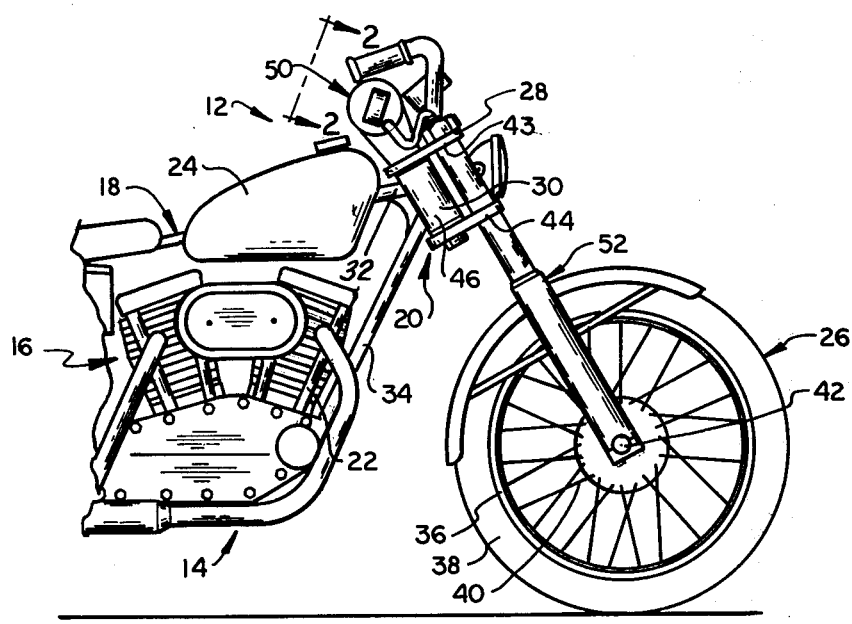
FIG. 1 is a fragmentary side elevational view of a motorcycle structure having an air shock apparatus of this invention mounted thereon.

The following is a discussion and description of preferred specific embodiments of the new air shock apparatus for motorcycles of this invention, such being made with reference to the drawings, whereupon the same reference numerals are used to indicate the same or similar parts and/or structure. It is to be understood that such discussion and description is not to unduly limit the scope of the invention.

SPECIFICATION OF THE INVENTION

In one preferred embodiment of this invention, an air shock apparatus indicated generally at 12, is shown as mounted on a forward portion of a motorcycle structure 14. The motorcycle structure 14 includes a power assembly 16 mounted on a support frame 18, and a front support assembly 20 connected to the support frame 18. The power assembly 16 is of a conventional nature having an internal combustion engine 22 supported by the support frame 18, and a fuel reservoir tank 24 operably connected to the internal combustion engine 22.

The front support assembly 20 includes a front wheel assembly 26 mounted through a steering yoke assembly 28 to a connector member 30 which, in turn, is connected to a pair of converging tube members 32, 34 of the support frame 18. The front wheel assembly 26 includes a conventional wheel member 36 with a tire member 38 mounted on a spoke wheel support 40. The spoke wheel support 40 is rotatably mounted on a central support shaft 42 which, in turn, is connected to the air shock apparatus 14 in a manner to be explained.

The steering yoke assembly 28 includes upper and lower support plates 43 and 44 which are secured to the connector member 30 and the air shock apparatus 12 as will be explained.

The connector member 30 includes a cylindrical support member 46 secured to the tube members 32, 34 and by a connector nut and bolt member 48 to the upper and lower support plates 43, 44.

The entire front support assembly 20 is pivotal about the connector member 30 for steering of the motorcycle structure 14 in a conventional manner.

On referring to the invention, the air shock apparatus 12 includes (1) a control and fluid supply means 50 mounted on the upper support plate 43; (2) a front fork support means 52 mounted between the upper and lower support plates 43, 44 and the front wheel assembly 26; and (3) a connector means 54 to connect the control and fluid supply means 50 to the front yoke support means 52.

Figure 2:
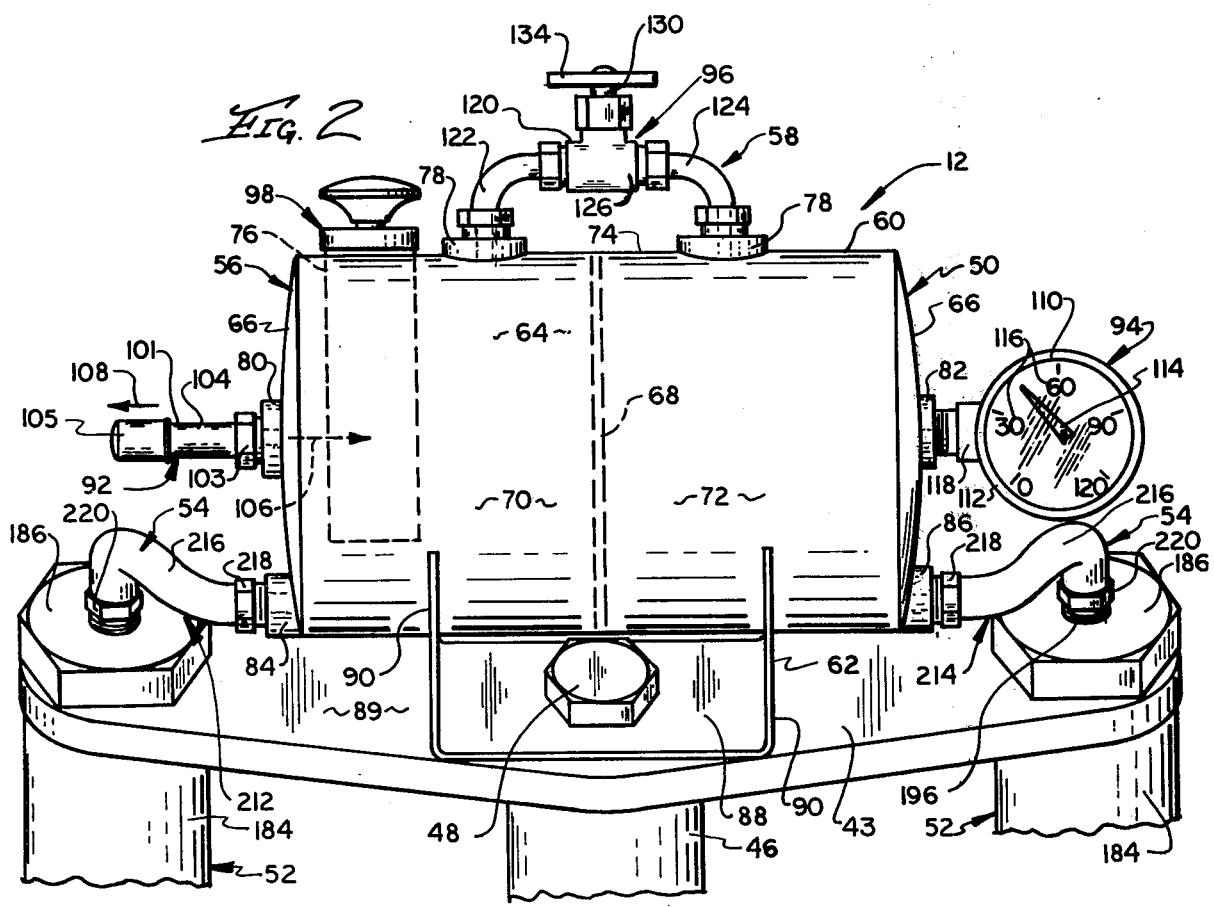
FIG. 2 is an enlarged fragmentary sectional view taken along line 2—2 of FIG. 1.

As shown in FIG. 2, the control and fluid supply means 50 includes a reservoir tank assembly 56 having a control means 58 mounted thereon. The reservoir tank assembly 56 includes a cylindrical tank member 60 mounted by an anchor bracket 62 to the upper support plate 43 to the connector nut and bolt member 48.

The cylindrical tank member 60 includes a cylindrical side wall 64 integral with arcuate end walls 66 and having a central separator wall 68 to divide the tank member 60 into a left chamber 70 and a right chamber 72. A top portion 74 of the side wall 64 is formed with (1) a pump receiver opening 76; and (2) cooperating, spaced connector lug members 78 having internal threads for a reason to be explained.

The opposed end walls 66 are each formed with aligned, central connector couplings 80, 82 and lower, aligned, first and second connector couplings 84, 86 to be utilized with the control means 58.

The anchor bracket 62 includes a bottom wall 88 mounted against a central, top surface 89 of the upper support plate 43 and parallel spaced anchor walls 90 connected to the bottom wall 88 and the cylindrical side wall 64. This rigidly supports the reservoir tank assembly 56 on the motorcycle structure 14.

The control means 58 includes (1) a fluid supply or bleed valve assembly 92 connected to the central connector coupling 80; (2) a fluid gauge assembly 94 connected to the other central connector coupling 82; (3) a fluid equalizer assembly 96 mounted between the connector lug members 78; and (4) a pump assembly 98 mounted in the pump receiver opening 76.

The supply or bleed valve assembly 92 resembles a conventional tire stem structure including a valve member 101 having a connector end 103 secured to the connector coupling 80, a central stem body 104 having one end secured to the connector end 103, and a cover cap member 105 mounted about the other end of the stem body 104. A spring loaded valve actuator (not shown) is contained within the central stem body 104 being operable (1) to allow pressure fluid to enter the tank member 60 as shown by an arrow 106, or (2) release pressure fluid from the tank member 60 as shown by an arrow 108.

The fluid gauge assembly 94 includes a conventional gauge member 110 having a housing 112 enclosing an indicator dial 114 which indicates PSI by indicator indicia 116 from 0–120 PSI. The housing 112 is integral with a connector stem 118 threadably mounted in the connector coupling 82.

As indicated jointly in FIGS. 2 and 4, the fluid equalizer assembly 96 includes a valve assembly 120 connected by first and second connector couplings 122, 124 to the couplings 78 and respective left and right chambers 70, 72 in the tank member 60. The valve assembly 120 includes a valve housing 126 having a fluid flow channel 128 therethrough that can be selectively opened and closed by a valve member 130 mounted in the valve housing 126. The valve housing 126 is provided with a seat section 132 mounted in the fluid flow channel 128. The valve member 130 includes a handle member 134 connected to a shaft member 136 which, in turn, has a seat member 138 connected thereto. The handle member 134 is rotatable in a conventional manner to move the seat member 138 relative to the seat section 132 to selectively open and close the fluid flow channel 128 to regulate pressure fluid flow between the left and right chambers 70, 72 for reasons to be obvious.

The first and second connector couplings 122, 124 merely provide sealed flow channels, indicated at 140, to both sides of the valve member 130 from the tank member 60.

The pump assembly 98 includes a pump housing 142 mounted in the pump receiver opening 76, a piston plunger assembly 144 mounted in the pump housing 142 and a fluid control assembly 146 formed in the pump housing 142. The pump housing 142 includes a cylindrical member 148 having the upper end closed by a cap member 150 and a lower end closed by a bottom wall 152. Upwardly of the bottom wall 152 is a ledge section 154 to limit downward movement of the piston plunger assembly 144.

The piston plunger assembly 144 includes a piston head 155 secured to a support shaft 156 which, in turn, extends through the cap member 150 and connected to an actuator knob 158. The piston head 155 seals with the inner wall 160 of the cylindrical member 148 in a conventional manner.

The fluid control assembly 146 includes 1) a fluid inlet line 162 in the cylindrical member 148 to allow exterior air to flow as shown by an arrow 164 to an inlet check valve 166; and 2) an outlet check valve 168 mounted opposite the inlet check valve 166 to allow air under pressure to flow into the left chamber 70 of the tank member 60 on movement of the piston plunger assembly 144.

The check valves 166, 168 operate in a conventional manner to allow fluid flow in only one direction due to obvious cooperation of a valve ball seat 167, a check ball 169, and a central spring member 171.

As shown in FIG. 3, the front fork support means 52 includes first and second front tube assemblies 172 and 174, each connected at upper ends to the upper and lower support plates 43, 44 and, at lower ends, to the central support shaft 42 of the front wheel assembly 26 as each front tube assemblies 172, 174 are substantially identical, only one need be described in detail.

The first front tube assembly 172 includes an upper tube assembly 176 slidably connected to a lower tube assembly 178 through a fluid seal assembly 180. The upper tube assembly 196 includes a main tube member 182 having an upper end portion 184 anchored against the upper support plate 43 by a fork cap member 186.

The main tube member 182 includes a main body 188 with a first inner fluid channel 190 integral with a smaller outlet flow channel 192 to allow fluid flow completely therethrough. The upper end portion 184 is provided with internal threads 194 to receive the fork cap member 186 thereon.

The fork cap member 186 (FIG. 2) resembles a plug member having a central threaded opening 196 for connection to the connector means 54 in a manner to be explained.

As seen in FIG. 3, the lower tube assembly 178 having a main tube body 198 to receive the main tube member 182 therein in a telescoping relationship. The main tube body 198 is formed with a central channel 201 and a lower connector end section 202. The channel 201 is open at the top to receive pressure fluid therein and having a closed bottom wall 204.

The connector end section 202 is formed with a transverse hole 206 for connection to the support shaft 42 of the front wheel assembly 26 (FIG. 1).

The fluid seal assembly 180 includes two spaced seal rings 208 which are mounted in grooves 210 in the main tube body 198 to seal against the outer surface of the main tube member 182. The rings 208 form a seal to maintain pressure fluid between the upper tube assembly 176 and the lower tube assembly 178 while still permitting relative axial movement without fluid leakage as shown by arrow 211.

As shown in FIG. 2, the connector means 54 includes first and second conduit assemblies 212 and 214, each having a hose member 216 provided at one end with a tank connector member 218 and, at the opposite end, with a tube connector member 220. The first conduit assembly 212 is connected by the tank connector member 218 to the left chamber 70 connector coupling 84 and the tube connector member 220 is connected to the central threaded opening 196 in the fork cap member 186 of the first front tube assembly 172. Similarly, the second conduit assembly 214 is connected by the tank connector member 218 to the right chamber 72 connector coupling 86 and the tube connector member 220 is connected to the central threaded opening 196 in the fork cap member 186 of the second front tube assembly 174.

USE AND OPERATION

In the use and operation of the air shock apparatus 12 of this invention, it can be sold in kit form adapted to be mounted on existing motorcycle structures 14 or built as a part of the manufacturer's original equipment.

In a kit, the first and second front tube assemblies 172, 174 are readily attached to the upper and lower support plates 43, 44 and anchored thereto by the respective fork cap members 186. The front wheel assembly 26 is connected by the support shaft 42 to the lower end portions 202 and hole 206 of the front tube assemblies 172, 174 (FIG. 1).

Next the control and fluid supply means 50 is mounted on the upper surface 89 of the support plate 43 through the anchor bracket 62 and the connector nut and bolt member 48. The connector means 54 is connected between the control and fluid supply means 50 and the first and second front tube assemblies 172, 174 as shown in FIG. 2.

Then, the operator can add fluid pressure (normally air) to the tank member 60 by the supply or bleed valve assembly 92 or the pump assembly 98 to the desired pressure as shown on the fluid gauge assembly 94. The fluid equalizer assembly 96 is adjusted into the open condition to place equal fluid pressure in the left and right chambers 70, 72. The fluid pressure in the tank member 60 is regulated to a desired pressure depending on whether traveling fast or slow plus if smooth or rough terrain to be traveled Periodically, the fluid equalizer assembly is opened to assure equal pressure in the chambers 70, 72. This is important so as to prevent tilting or unbalance in the front wheel assembly 26.

It is seen that the air shock apparatus of this invention is easy to install and has adjustable features not found in the prior art devices. Additionally, the air shock apparatus is durable in construction, handy to the motorcycle rider, and requires little maintenance.

While the invention has been described in conjunction with preferred specific embodiments thereof, it will be understood that this description is intended to illustrate and not to limit the scope of the invention, which is defined by the following claims.

I claim:

1. An air shock apparatus adapted to provide a cushioned shock absorbing ride to the front wheel assembly of a motorcycle, comprising:
   (a) a control and fluid supply means mounted on the motorcycle holding a supply of air under pressure;
   (b) a front fork support means mounted to and between the motorcycle and the front wheel assembly;
   (c) a connector means connected to said control and fluid supply means and said front fork support means to convey said air under pressure therebetween;
   (d) said front fork support means having a pair of parallel first and second front tube assemblies;
   (e) each of said first and second front tube assemblies having an upper tube assembly connected to the motorcycle and a lower tube assembly telescopingly mounted about said upper tube assembly and connected to the front wheel assembly,
   (f) said control and fluid supply means having a reservoir tank assembly connected to the motorcycle and a control means mounted on said reservoir tank assembly;
   (g) said reservoir tank assembly divided into a left chamber and a right chamber connected to respective ones of said first front tube assembly and said second front tube assembly; through said connector means;
   (h) said control means having a bleed valve assembly to add or remove fluid pressure from said reservoir tank assembly,
   (i) said control means having a fluid equalizer assembly connected to said reservoir tank assembly to regulate fluid pressure between said left chamber and said right chamber;
   (j) said fluid equalizer assembly including a conduit member mounted between said right chamber and said left chamber and a valve member mounted in said conduit member;
   (k) said valve member operable to be opened and closed to equalize fluid pressure between said left chamber and said right chamber; and
   (l) said control means includes a pump assembly mounted in one of said chambers and having a reciprocating piston plunger assembly to receive atmospheric air from outside said reservoir tank assembly and pump said atmospheric air under pressure into said reservoir tank assembly, whereby said upper tube assembly and said lower tube assembly are movable relative to each other under cushion of said air pressure in said control and fluid supply means.

2. An air shock apparatus as described in claim 1, wherein:
  (a) said control means having a gauge member connected to said reservoir tank assembly to monitor the pressure of the air held therein.

3. An air shock apparatus as described in claim 1, wherein:
  (a) said upper tube assembly having a top fluid flow channel that is integral with a smaller, restricted opening into said lower tube assembly;
  (b) said lower tube assembly having a central cavity to receive a lower end section of said upper tube assembly; and
  (c) said central cavity receives said upper tube assembly therein similar to piston-cylinder members and said restricted opening acts as a cushion to control air flow between said upper tube assembly and said lower tube assembly.

* * * * *